United States Patent [19]

Newhard

[11] Patent Number: 5,407,567
[45] Date of Patent: Apr. 18, 1995

[54] COMPARTMENTALIZED SWIMMING POOL CHEMICAL DISPENSER

[76] Inventor: Harry W. Newhard, 2 Pebble Creek Rd., St. Louis, Mo. 63124

[21] Appl. No.: 143,743

[22] Filed: Nov. 1, 1993

[51] Int. Cl.⁶ ............................................. B01D 11/02
[52] U.S. Cl. .................. 210/198.1; 210/169; 210/205; 210/232; 210/242.1; 422/275; 422/277; 206/501
[58] Field of Search ............ 210/169, 198.1, 205, 210/206, 232, 242.1; 137/268; 422/275, 276, 277; 206/501, 503

[56] References Cited

U.S. PATENT DOCUMENTS

| | | | |
|---|---|---|---|
| 2,734,625 | 2/1956 | Nelson | 206/503 |
| 2,826,484 | 3/1958 | Buehler | 210/198.1 |
| 2,957,601 | 10/1960 | Novick | 206/503 |
| 2,960,250 | 11/1960 | Haloski | 206/503 |
| 3,349,941 | 10/1967 | Wanderer | 206/503 |
| 3,369,691 | 2/1968 | Wei | 206/503 |
| 3,607,103 | 9/1971 | Kiefer | 422/277 |
| 3,899,425 | 8/1975 | Lewis . | |
| 4,040,962 | 8/1977 | Hanford . | |
| 4,317,733 | 3/1982 | Xhonneux . | |
| 4,338,191 | 7/1982 | Jordan . | |
| 4,363,728 | 12/1982 | Guglielmi et al. . | |
| 4,389,311 | 6/1983 | La Freniere | 210/198.1 |
| 4,584,106 | 4/1986 | Held . | |
| 4,780,197 | 10/1988 | Schuman . | |
| 4,781,897 | 11/1988 | Geron et al. | 210/169 |
| 4,822,571 | 4/1989 | Nicholson et al. | 422/264 |
| 4,938,390 | 7/1990 | Markva | 156/69 |
| 4,978,023 | 12/1990 | Behlmann et al. | 206/501 |
| 5,026,477 | 6/1991 | Yen | 210/169 |
| 5,059,316 | 10/1991 | Renton | 210/198.1 |
| 5,064,624 | 11/1991 | King | 422/264 |
| 5,124,032 | 6/1992 | Newhard . | |
| 5,181,281 | 1/1993 | Jang | 422/277 |

Primary Examiner—Robert A. Dawson
Assistant Examiner—Robert James Popovics
Attorney, Agent, or Firm—Kalish & Gilster

[57] ABSTRACT

A swimming pool treatment device for simultaneous introduction of at least two separately stored chemicals into the water of a swimming pool has an enclosed, selectively openable first hollow body portion for containing and dispensing a first chemical into the swimming pool water. At least a second enclosed, selectively openable hollow body portion is included for containing and dispensing at least a second chemical into the swimming pool water. The first hollow body portion and the at least a second hollow body portion are selectively detachably interengaged with one another. The first hollow body portion and the at least a second hollow body portion are selectively detachably interengaged with one another, to thereby provide a way to simultaneously introduce at least two separately stored chemicals into the water of the swimming pool.

12 Claims, 2 Drawing Sheets

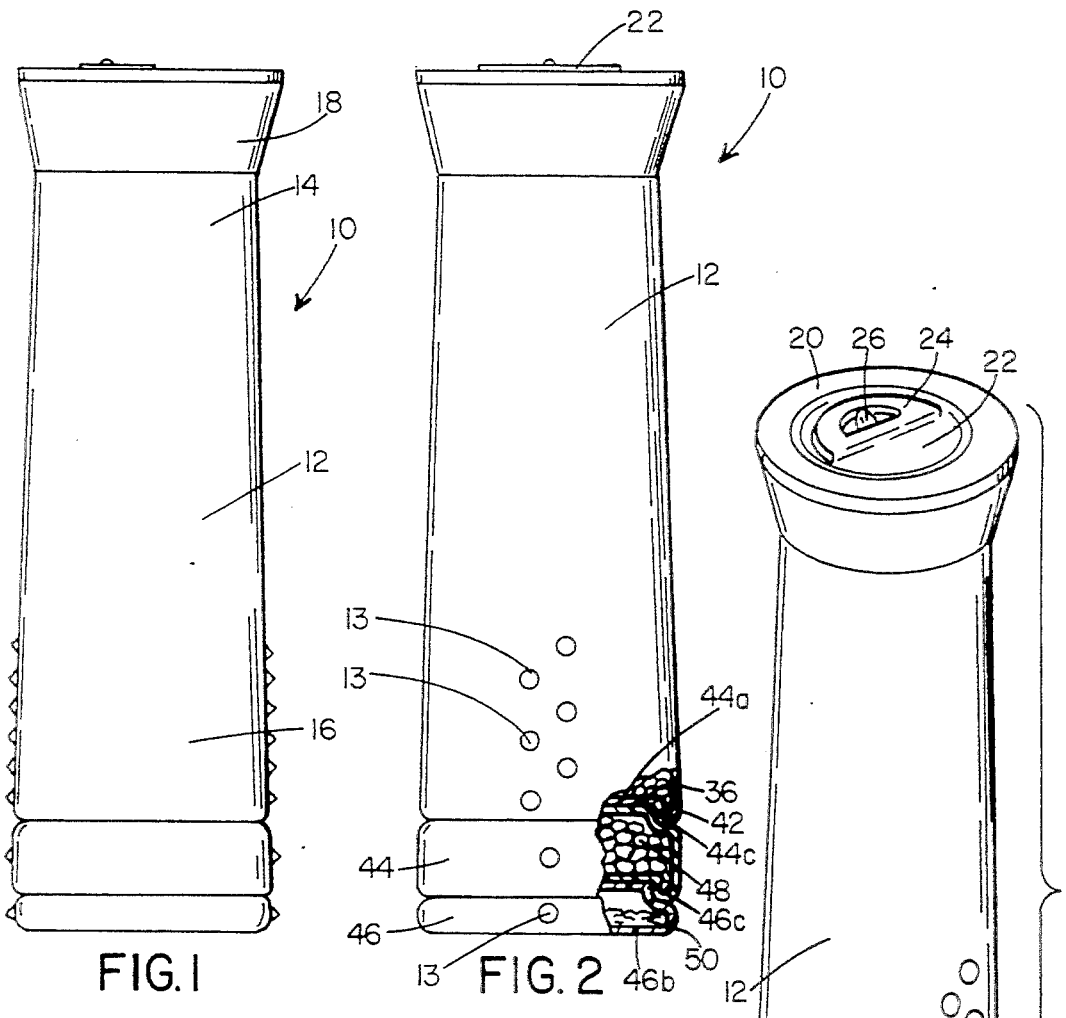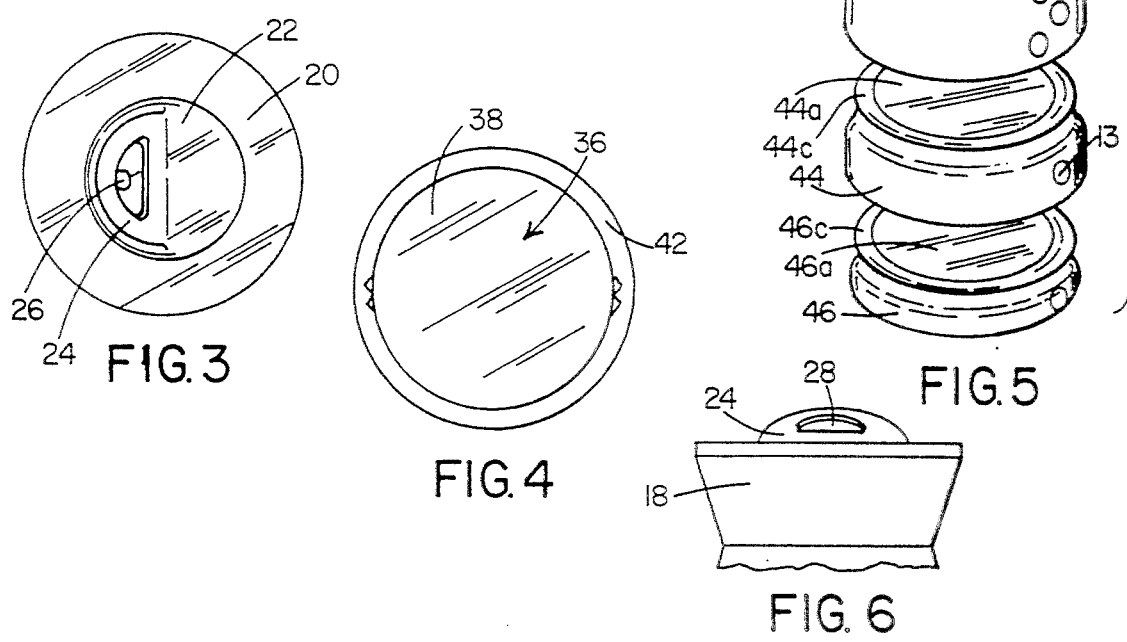

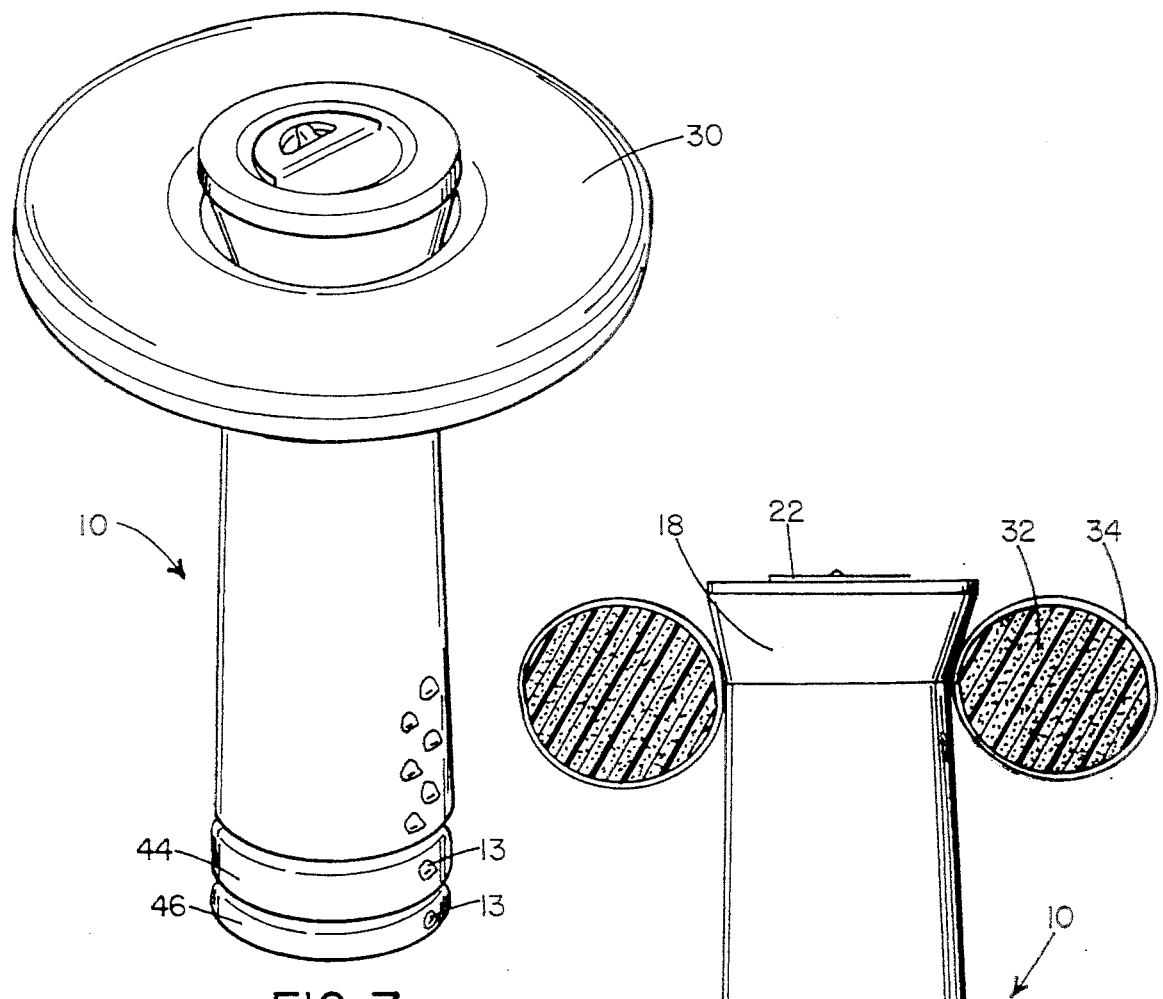

COMPARTMENTALIZED SWIMMING POOL CHEMICAL DISPENSER

BACKGROUND AND SUMMARY OF THE INVENTION

The present invention relates generally to the field of chemical treatment devices for swimming pools, and, more particularly, to a new swimming pool treatment device which effectively provides a system for selective, simultaneous dispensing of one or more chemicals from the same device.

Previously, various swimming pool treatment devices have been known for adding chemicals, such as chlorine, to the swimming pool water to prevent growth of algae and bacteria therein. One such type of known devices is the "in-line" variety, characterized by being adapted for placement in the stream of water which is caused to move by the pool's circulating system. A recent example of this type of device is featured in U.S. Pat. No. 5,124,032, by the inventor herein and is formed for treating the pool's water with a single chemical, such as, for example, chlorine. The teachings of this patent are incorporated herein by reference. The patented device is positioned in the stream of circulating water which enters the device and carries dissolved chemical out of the container portion of the device and into the pool as the water exits through small holes formed by snapping off protrusions on the wall of the chemical containing portion.

Other devices float freely in the pool, rather than being placed directly in the flow of circulating water. However, in the usual case, regardless of the type of apparatus used for introducing the substance into the pool, only one particular chemical could be shipped and stored in any one particular treatment device because direct contact of certain chemicals often used for pool water treatment can interact with undesirable results, such as explosion. Thus, careful separation of the chemicals during storage, shipping and use has always been the rule. However, such provisions for shipping and storage of chemicals is ultimately messy, inconvenient and potentially dangerous because at some point smaller amounts must be made available to the consumer for private use and thus small useful amounts must be separated from the bulk, requiring handling and sometimes repackaging. Ideally, it is desirable for such chemicals to be packaged, shipped and sold in amounts and combinations which are convenient for immediate, facile private use.

There are a number of important advantages in the new unit as proposed. Among others, it could be used in either a new floating configuration or in connection with a skimmer or circulation system, as well as being possibly mounted at the pool edge. Further, from the user's perspective, it is a "one-step" solution to taking care of a swimming pool, in that the user does not have to ascertain the relative proportions of chemicals in advance, but can be assured instead that when the new unit is put into the water, it will dose the three different chemicals (or two different chemicals, four different chemicals, etc.) in the proper amounts based on the size of a swimming pool.

Also, when the unit is depleted, it is simply discarded and a new one is placed in use, with relative assurance that the chemicals will be released in the proportion predetermined to be efficacious for a given size of pool.

There are also the advantages that the chemicals needed for proper pool care are all available for distribution in a single unit, whereby the swimming pool owner/operator can be assured that proper pool care will be obtained by the use of just a single unit, and with relative precision as well as economy in the release of the different chemicals. Manifestly, the ability to have a single unit for dosing the swimming pool with the required chemicals eliminates a great deal of fuss and bother, as well as need for great care in providing different chemicals, which heretofore has been required for pool owners. There are various marketing advantages as well.

Accordingly, it is among the several objects of the present invention to provide a device for chlorinating or otherwise chemically treating swimming pool water, which is adapted for safe storage and selective addition of one or more chemicals to the pool water by the same device, separately, or simultaneously, if desired.

It is further among the objects of the invention having the features indicated that subject device be suitable for inexpensive, facile manufacture from a readily available substance which is suitable for storage and dispensing of a number of different kinds of chemicals.

It is also among the objects of the present invention that subject device be capable of easy, safe use by individual consumers with a minimum of instruction.

It is still further among the objects of the present invention that the new swimming pool chlorinator, having the features mentioned, be capable of use in either of the free-floating or in-line fashions.

Accordingly, in furtherance of the above objects, the present invention is, briefly, a swimming pool treatment device for simultaneous introduction of at least two separately stored chemicals into the water of a swimming pool. The treatment device includes an enclosed, selectively openable first hollow body portion for containing and dispensing a first chemical into the swimming pool water. At least a second enclosed, selectively openable hollow body portion is also included for containing and dispensing at least a second chemical into the swimming pool water. The first hollow body portion and the at least a second hollow body portion are selectively detachably interengaged with one another. The hollow body portions are selectively detachably interengaged with one another, to thereby permit simultaneous introduction of at least two separately stored chemicals into the water of the swimming pool.

The present invention is also, briefly, a system for chemical treatment of the water in a swimming pool. The system has a plurality of selectively detachable interengaged sealed containers forming one unitary device. Each of the sealed containers has a water treatment chemical composition enclosed therein for shipping and storage. The chemical compositions in the respective compartments are prevented by the enclosure of the respective compartment from mixing with the chemical composition of any other compartment. Each of the sealed containers is adapted for forming apertures therethrough to permit entrance and exit of water so that the water treatment chemical within the respective container can be dissolved and dispensed into the swimming pool water simultaneously from two or more of the plurality of selectively detachable interengaged sealed containers.

At least two of the above plurality of selectively detachable interengaged sealed containers have matching interengaging portions so that their relative positions in the system may be altered and so that at least one of the sealed containers may be completely removed from the system while permitting the remaining sealed containers to still be selectively detachably interengaged.

The at least two interengaged sealed containers having different volumes for the respective chemical compositions are adjacent to one another and have volumes which diminish from an upper sealed container to an adjacent lower sealed container, whereby a sealed container containing a greater volume of its chemical composition will be located above a sealed container containing a lesser volume of its chemical composition.

Other objects will be in part apparent and in part pointed out hereinbelow.

BRIEF DESCRIPTION OF THE DRAWINGS

FIG. 1 is a side elevational view of a swimming pool chemical treatment device constructed in accordance with and embodying the present invention.

FIG. 2 is a side elevational view of the device of FIG. 1, rotated 90 degrees along the longitudinal axis and partially broken away, showing the interior of the chemical chambers.

FIG. 3 is a top plan view of the device of FIG. 1.

FIG. 4 is a bottom plan view of the device of FIG. 1, with the accessory compartments removed therefrom.

FIG. 5 is an exploded view of the device of FIG. 1.

FIG. 6 is a partial view of the top of the device of FIG. 2 with the handle portion lifted.

FIG. 7 is a perspective view of the device of FIG. 1 with a floatation device added thereto.

FIG. 8 is a side elevation view of the device of FIG. 7 showing a vertical section of the floatation device.

FIG. 9 is an enlarged sectional view of the area indicated on FIG. 8.

Throughout the drawings, like numbers indicate like elements.

DESCRIPTION OF PREFERRED EMBODIMENTS

With reference to the drawings, a swimming pool treatment device (or chlorinator), generally designated 10, having a canister configuration and which is preferably formed of molded semi-soft plastic, such as polyethylene, and consists of an elongated, hollow, tubular body portion 12 with a continuous annular side wall extending between and connecting a top end 14 and a bottom end 16, in normal, substantially vertical, use position.

At top end 14 the annular side wall continues upwardly into a preferably outwardly flared head portion 18. Head portion 18 desirably terminates upwardly in a flat, inwardly turned flange 20 which borders an optional central opening (not shown), closed by a tight-fitting lid 22. Alternatively, lid 22 may not be removable, but rather forms an integral part of the top end of the chemical canister 12.

Lid 22 preferably has an integral handle 24 which may be folded flat and retained in this position by a tab 26, as seen in FIGS. 3 and 5, or may be released from tab 26 to extend upwardly, as shown in FIG. 6. Handle 24 defines an aperture 28, which may be used, when in the upward position, as a site for securing a hook or line if it is desired to position treatment device 10 at a particular place in the pool, or, for example, in the flow of the pool's circulating system.

Alternatively, device 10 may be permitted to float freely in the pool, in which case, provision of handle 24 is unnecessary. And, if otherwise so heavy that it would sink, device 10 can be supplemented with a floatation device, such as a floatation ring 30. As seen in FIGS. 7 and 8, floatation ring 30 is sized so as to slip around body portion 12, but does not have an opening so large that the ring can slip over head portion 18. Floatation ring 30 is preferably formed of a light-weight floatable foam 32 encased in shell 34, which may be formed of plastic, foil, paint or other materials. Of course, ring 30 may be simply an "empty" air-filled shell 34 (if sufficiently large to off-set the weight of the chemical-containing body portion of device 10), or conversely, it may be only a ring of foam 32, such as styrofoam, without any protective shell.

The annular side wall of body portion 12 is provided with a plurality of outwardly directed known protrusions or "break-offs" 13, which can be snapped off or punched out, as desired, to permit access of pool water into and out of the interior of body 12 in order to dissolve the chemical therein and then release the dissolved treatment chemical into the pool water. Examples of different types of dry chemicals which may be stored in and later released from body 12 in the form of, for example, crystals, nuggets, powders or chunks, as the case may be, are chlorine, algicide, clarifiers, pH adjusters, etc.

Bottom end 16 of body portion 12 terminates downwardly in a base 36 which is preferably flat at its central area 38, and closed, so as to retain within the hollow chamber of body portion 12 whatever preselected chemical, such as that indicted by element number 40, is stored there. Central area 38 is formed so as to be raised, slightly upwardly from a depending, peripheral lip 42 which serves as an interlocking feature, as described hereafter.

As shown in FIGS. 1, 2, 5, 7 and 8, a plurality of relatively short accessory compartments, such as those indicated by way of illustration at 44, 46, and which each contain chemicals, therein (such as those indicated at 48, 50, as examples only) can be snapped onto base 36 in substantially whatever order is desired.

Accessory compartments 44, 46 are each fully enclosed hollow cylindrical containers, preferably having a diameter equal to that of body 12. Like body 12, they also have a continuous annular side wall which extends between and connects the corresponding top end 44a, 46a and bottom end 44b, 46b of the respective container. Like body 12, the annular side walls of each accessory compartment 44, 46 also has formed protrusions 13 intended to be broken off prior to placement of treatment device 10 into the pool water.

In the preferred form of the accessory compartments each such compartment has a centrally indented (concave) bottom surface, such as that shown in FIGS. 4 and 9 at 38, and a depending peripheral lip such as that shown at 42 and discussed in relation to body 12. However, the top surfaces of each accessory compartment are effectively the opposite in structure. That is, as seen most clearly in FIG. 9, they are each provided with a preferably flat central region, for example as shown at 44a, 46a, which is generally convex and corresponds in size to the concave central area of the lower or bottom end surfaces into which the upper canister (compartment) ends interlock.

The accessory canister top end central surfaces are each bounded by a narrow, thin, annular peripheral flange 44c, 46c, respectively. The peripheral flange of each accessory compartment is sufficiently flexible to permit slipping, when forced, past the depending lip, such as 42, of a colinearly positioned, adjacent compartment, or, depending upon the combination desired, of the colinear, adjacent base of body 12. Nonetheless, the peripheral flanges are also sufficiently stiff to retain the associated compartment in an interlocking position with an adjacent compartment or body 12 by interengaging with the depending lip of the bottom thereof, as shown in the cut-away portion of FIG. 2, and in FIG. 9.

So engaged, there is ordinarily a double thickness of plastic separating the chemicals contained in any two adjacent compartments or body 12. For simplicity of the drawings only portions of these structures are shown in FIG. 2. In FIG. 5 flanges 44c, 46c are shown exaggerated, for clarity. In actuality, the interengagement of depending lips and peripheral flanges is simply a forcible, snap-fit annular detent and groove arrangement, as shown in the enlarged, partial view labeled FIG. 9.

Other than optional variations in length, the various accessory compartments are all substantially identical, and thus interchangeable in position, except that accessory compartments structured as compartment 46, having a flat bottom 46b, without the receiving indentation bounded by a depending peripheral lip, is not useful at an intermediate position, between two other compartments. Rather, if that style of compartment is chosen, it can only be placed at the lowermost compartment position.

Otherwise, the various chemical accessory compartments can be interchanged in linear order, and an indeterminate plurality of them can be attached together in colinear arrangement, as may be necessary. The number of accessory compartments attached to body 12 of device 10 can be altered as required in order to provide a sufficient amount and the proper types of chemicals, depending upon the volume of pool water to be treated and the condition thereof.

Alternatively to the structure shown, either the top or bottom of the compartments and the bottom of body 12 can be formed to be removable. For example, a thin foil or cover of other material can serve as bottom 38. With such construction lid 22 can be integral and not removable from body 12. Rather, body 12 is filled with the selected chemical substance via the aperture which is then sealed at the lower end of bottom 16. It is only necessary that until immediately prior to use, the chosen sealing structure functions adequately to keep the substance within body 12 separate from chemicals in any accessory compartments or other treatment device compartment during shipment and storage, until breakoffs 13 are intentionally removed from bottom 16 of body 12 and from the side walls of any accessory compartments used for chemical application to the pool water.

Thus it is readily understood that the sizing of body 12 and any accessory compartments added thereto can be varied as required, and may be relatively critical, in that the volume of the chemical in the respective compartments is predetermined to be correct for an appropriate size of swimming pool. For example, there may be two and one-half pounds of the chlorine-releasing agent, three to four ounces of algicide, and one to two ounces of clarifier. However, all of the compartments are snapped together to make a unitary "system" or pre-packaged container of unitary configuration. The individual compartments are closed by a thin membrane of plastic, so as themselves to be self-contained, and sealed until the knock-outs in the respective compartments are opened.

In this way, the new container allows the shipment of all of the chemicals in a single unit in such a manner as to preclude their becoming mixed or coming into contact with each other prior to introduction into the swimming pool environment (where water would simultaneously leach or dissolve chemicals from each of the three or more compartments). Of course the prefilled compartments may also be shipped and stored individually, as may be required by law, and so that the consumer may select the particular combination of types and amounts of chemicals, and quantities of containers, that he or she desires. Needs may vary of course depending upon the water chemistry of a particular region or in a specific pool.

In view of the foregoing, it will be seen that the several objects of the invention are achieved and other advantages are attained.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A swimming pool treatment device for simultaneous introduction of at least two separately stored chemicals into the water of a swimming pool; the treatment device comprising an enclosed, selectively openable first hollow body portion containing and constructed for dispensing a first pool treatment chemical into the swimming pool water, and at least a second enclosed, selectively openable hollow body portion containing and constructed for dispensing at least a second pool treatment chemical into the swimming pool water, the first hollow body portion and the at least a second hollow body portion being selectively detachably interengaged with one another, and means for causing the first hollow body portion and the at least a second hollow body portion to be selectively detachably interengaged with one another, to thereby provide a means for simultaneous introduction of said separately stored chemicals into the water of the swimming pool, and wherein the means for causing the first hollow body portion and the at least a second hollow body portion to be selectively detachably interengaged with one another is a peripheral lip extending from the first hollow body portion and a peripheral flange extending from the at least a second hollow body portion, the peripheral flange and the peripheral lip being formed to an appropriate size and shape and positioned for detenting interengagement with one another, to thereby connect the first hollow body portion and the at least a second hollow body portion in a snap-fit manner.

2. The swimming pool treatment device of claim 1, wherein the first hollow body portion has an integral handle for suspension of the device within a stream of circulating water in the swimming pool.

3. The swimming pool treatment device of claim 1, and further comprising a floatation device connected to the first hollow body portion to permit the treatment device to float freely in the swimming pool water.

4. The swimming pool treatment device of claim 1, and further comprising at least a third hollow body portion, the second hollow body portion being selectively detachably interengaged to the first hollow body portion and the at least a third hollow body portion being selectively detachably interengaged to the second hollow body portion, to permit simultaneous treatment of the water of a swimming pool into which the treatment device is introduced with at least three chemical substances which have been separately stored in corresponding first, second and at least third hollow body portions of the device.

5. A system for chemical treatment of the water in a swimming pool, the system comprising a plurality of selectively detachable interengaged sealed containers forming one unitary device, each of the sealed containers having a water treatment chemical composition enclosed therein for shipping and storage, the chemical compositions in the compartments being prevented by the enclosure of the respective closures thereof from mixing with the chemical composition of any other compartment, each of the sealed containers having means for forming apertures therethrough to permit entrance and exit of water so that the water treatment chemical within the respective container can be dissolved and dispensed into the swimming pool water simultaneously from two or more of the plurality of selectively detachable interengaged sealed containers.

6. The system of claim 5, wherein at least two of the plurality of selectively detachable interengaged sealed containers have matching interengaging portions so that their relative positions in the system may be altered and so that at least one of the sealed containers may be completely removed from the system while permitting the remaining sealed containers to still be selectively detachably interengaged.

7. The system of claim 6, wherein the detachable interengaged sealed containers are oriented one above another in a vertical array.

8. The system of claim 5, wherein at least two of the plurality of selectively detachable interengaged sealed containers have different volumes for permitting containment of different respective amounts of water treatment chemical compositions.

9. The system of claim 8, wherein the at least two interengaged sealed containers having different volumes for the respective chemical compositions are adjacent to one another and have volumes which diminish from an upper sealed container to an adjacent lower sealed container, whereby a sealed container containing a greater volume of its chemical composition will be located above a sealed container containing a lesser volume of its chemical composition.

10. The system of claim 5, wherein at least two of the plurality of selectively detachable interengaged sealed containers contain different types of water treatment chemical compositions so that the swimming pool water can be simultaneously treated for more than one condition by use of the unitary device.

11. The system of claim 5, and further comprising means for providing buoyancy for the device for causing the system to be free-floating when the system is placed into the water of a swimming pool.

12. The system of claim 11, wherein the means for providing buoyancy comprises a float ring secured to an upper first one of the sealed containers, the float ring causing the device to float in an erect condition with one sealed container above another.

* * * * *